United States Patent [19]

Aoki

[11] Patent Number: 4,739,168
[45] Date of Patent: Apr. 19, 1988

[54] X-RAY DETECTOR AND METHOD FOR MANUFACTURING THE SAME

[75] Inventor: Hisatoshi Aoki, Ootawara, Japan

[73] Assignee: Kabushiki Kaisha Toshiba, Kawasaki, Japan

[21] Appl. No.: 862,716

[22] Filed: May 13, 1986

[30] Foreign Application Priority Data

May 14, 1985 [JP] Japan ................... 60-100416

[51] Int. Cl.⁴ .............................. G01T 1/161
[52] U.S. Cl. ......................... 250/368; 250/227;
250/363 R; 350/96.27; 378/97
[58] Field of Search ............ 250/368, 363 R, 483.1,
250/485.1, 361 R, 227, 367; 378/108, 97;
350/96.27

[56] References Cited

U.S. PATENT DOCUMENTS

| 3,752,991 | 8/1973 | Slagle | 378/97 |
| 4,262,206 | 4/1981 | Viehmann | 250/483.1 |
| 4,467,208 | 8/1984 | Müller et al. | 250/483.1 |

FOREIGN PATENT DOCUMENTS

| 3242663 | 5/1984 | Fed. Rep. of Germany . |
| 3355512 | 4/1985 | Fed. Rep. of Germany . |
| 17904 | 1/1982 | Japan | 350/96.27 |

OTHER PUBLICATIONS

"Design of a Plastic Scintillator Hodoscope with One Millimeter Spatial Resolution" R. R. Crittenden, S. C. Ems, R. M. Heinz and J. C. Krider–Nov. 28, 1980.

Primary Examiner—Janice A. Howell
Assistant Examiner—Constantine Hannaher
Attorney, Agent, or Firm—Finnegan, Henderson, Farabow, Garrett & Dunner

[57] ABSTRACT

An X-ray detector consists of a substrate, a light reflecting layer, an optical fiber group, a light-shielding layer, an intensifying screen, a light-shielding member, and an optical detector. A coarse portion is formed on at least one surface of the optical fiber group, which is arranged to be substantially flat so as to correspond to a detection area. The light reflecting layer, the optical fiber group having the coarse portion, the light-shielding layer having an opening corresponding to the detection area, and the intensifying screen are disposed on the substrate in the order named. A laminated layer of the substrate, the light reflecting layer, the optical fiber group, the light-shielding layer, and the intensifying screen, excluding an extension of the optical fiber group, is covered with the light-shielding member. The distal end of the extension of the optical fiber is coupled to the optical detector.

16 Claims, 3 Drawing Sheets

X-RAY DETECTOR AND METHOD FOR MANUFACTURING THE SAME

BACKGROUND OF THE INVENTION

The present invention relates to an improved X-ray detector for use in an automatic X-ray exposure unit for an X-ray radiographic device, and a method for manufacturing the X-ray detector.

In an X-ray diagnostic device, i.e., an X-ray radiographic device, X-rays transmitted through an object under examination are applied to an X-ray image-forming material, e.g., an X-ray film, to form a transmitted X-ray image. An automatic X-ray exposure unit is provided in the radiographic device and has an X-ray detector. It detects X-rays incident on the X-ray film and monitors the X-ray dose. The unit controls the X-ray exposure time, so that X-ray radiation is automatically stopped when an X-ray dose necessary for obtaining an X-ray picture of adequate density is radiated.

Among X-ray detectors used in the automatic X-ray exposure unit are: one which comprises a combination of an intensifying screen, for converting X-rays to a light beam, and an optical detector; and another which uses a semiconductor X-ray detector, and the like. The X-ray detector, that converts the X-rays to a light beam with an intensifying screen and detects the light beam with an optical detector, uses a transparent acrylic resin plate to guide light from the intensifying screen to the optical detector. More specifically, this type of X-ray detector consists of an X-ray detecting section and an optical detector. The X-ray detecting section has an acrylic resin plate, an X-ray/light-converting intensifying screen, and a light-reflecting layer. The acrylic resin plate has an irregular reflecting surface for receiving light at a predetermined detection region. The intensifying screen is arranged on a portion of one surface of the plate corresponding to the irregular reflecting surface. The reflecting layer is arranged on the other surface of the plate. A light-guide projection is formed on one side of the plate. The intensifying screen is arranged on one entire surface of the plate, with a light-shielding sheet interposed therebetween. The light-receiving section of the optical detector is arranged on the distal end face of the light-guide projection. The detector is completely covered by a light-shielding film, except for a contact section thereof.

The acrylic resin plate conventionally used in the X-ray detecting section of the X-ray detector does not have a sufficiently high transmittance. In the above X-ray detector, light is transmitted from the intensifying screen to the optical detector through the acrylic resin plate, utilizing the irregular reflection of light from the irregular reflecting portion formed thereon, resulting in poor light transmission efficiency. A photomultiplier is conventionally used as the optical detector. The photomultiplier must be arranged in tight contact with the distal end face of the light-guiding projection of the acrylic resin plate. As a result, the size of the photomultiplier defines the substantial area occupied by the X-ray detector. In other words, the size of the X-ray detector hinders size reduction and simplification of the structure of the overall device. For example, the thickness of the X-ray detecting section can be set to be about 3.0 mm, whereas the diameter of the photomultiplier is 1 to 2 cm at minimum. Therefore, the peripheral members of the X-ray detector must be arranged away from the photomultiplier, of the 1 to 2 cm or more diameter, arranged in the vicinity of the acrylic resin plate of the 3.0 mm thickness, and also away from the acrylic resin plate.

The larger the distance between the converting intensifying screen and the optical detector, the larger the attenuation in the light converted from X-rays and guided to the optical detector through the acrylic resin plate. The light detecting coefficiency of the photomultiplier within a light-receiving area corresponding to a predetermined X-ray detection area, i.e., the irregular reflecting section for receiving light from the intensifying screen, is thus non-uniform, resulting in a non-uniform X-ray detecting coefficiency within the predetermined X-ray detection area.

SUMMARY OF THE INVENTION

It is an object of the present invention to provide an inexpensive X-ray detector which provides a good, uniform detecting coefficiency within the entire region of a predetermined X-ray detection area, which is reduced in size, and which can be easily manufactured, and a method for manufacturing the same.

An X-ray detector achieving the above objects according to the present invention comprises an intensifying screen for X-ray photography, the intensifying screen being arranged at least at a predetermined X-ray detection area and to convert incident X-rays to light; a group of optical fibers, arranged to be flat on at least the predetermined X-ray detection area, in tight contact with the intensifying screen, and having a coarse portion for receiving light from the intensifying screen on at least one surface thereof corresponding to the detection area, for guiding light incident on the coarse portion; a light-shielding member for covering the intensifying screen and the optical fiber group, excluding an extension of the optical fiber group and a connection of the optical fiber group with the intensifying screen; and an optical detector, coupled to a distal end of the extension of the optical fiber group, for converting an optical signal transmitted through the optical fiber group to an electrical signal.

A method for manufacturing an X-ray detector according to the present invention comprises a first step of forming a coarse portion on at least one surface of an optical fiber group, arranged to be substantially flat to correspond to a detection area; a second step of sandwiching the optical fiber group having the coarse portion formed thereon between a light reflecting layer and an intensifying screen and placing the assembly on a substrate; a third step of covering a laminated layer of the intensifying screen, the optical fiber group, the light reflecting layer, and the substrate, excluding an extension of the optical fiber group, with a light-shielding member; and a fourth step of coupling a distal end of the extension of the optical fiber group to an optical detector.

According to the present invention, an optical fiber, which has a low X-ray absorbancy and good transmittance, is used as a light transmitting material. The X-ray detecting section can thus be made compact and can provide a greatly improved light detecting coefficiency. With the optical fiber, the length of the light transmitting path from a light-receiving section to the optical detector can be set to be substantially uniform within the light-receiving area. In addition, attenuation of the light occurring in the transmitting path is low. Therefore, the detecting coefficiency within a detection area becomes uniform, and the shape of the detection area can be arbitrary. Furthermore, the manufacturing process is easy, thereby providing an inexpensive X-ray detector.

DETAILED DESCRIPTION OF THE PREFERRED EMBODIMENTS

An X-ray detector according to an embodiment of the present invention will be described with reference to the accompanying drawings.

Figure 1:
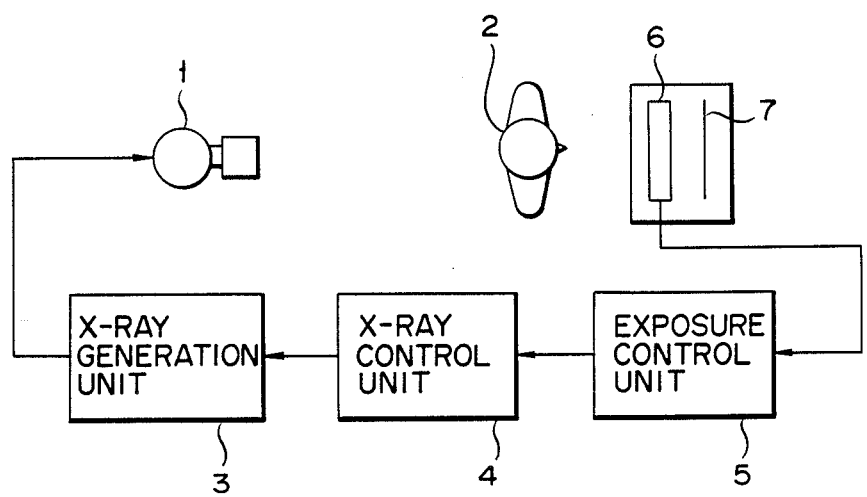
FIG. 1 is a block diagram schematically showing a configuration of an X-ray radiographic device incorporating an X-ray detector according to an embodiment of the present invention.

FIG. 1 shows the configuration of an X-ray radiographic device incorporating an automatic X-ray exposure unit using an X-ray detector according to an embodiment of the present invention. The X-ray radiographic device comprises X-ray tube 1, X-ray generation unit 3, X-ray control unit 4, X-ray exposure control unit 5, and X-ray detector 6. When a high voltage is applied to tube 1 from unit 3, X-rays are emitted from tube 1 onto object 2. The X-rays emitted from tube 1 and transmitted through object 2 are detected by detector 6. X-ray film 7 for receiving picture image information from the X-rays transmitted through object 2 is arranged near detector 6. The detection signal from detector 6 is supplied to unit 5. When the X-ray dose detected by detector 6 reaches a predetermined reference value, unit 5 produces an X-ray radiation stop signal. The X-ray dose on the detection area of detector 6 corresponds to that on film 7, whose area corresponds to the detection area of detector 6. Therefore, if the reference value is accurately determined, the X-ray dose on film 7 has a sufficient value for producing an X-ray picture of an appropriate density. Unit 4 supplies a control signal to unit 3 in response to the X-ray radiation stop signal, and stops radiation by tube 1.

Figure 2:
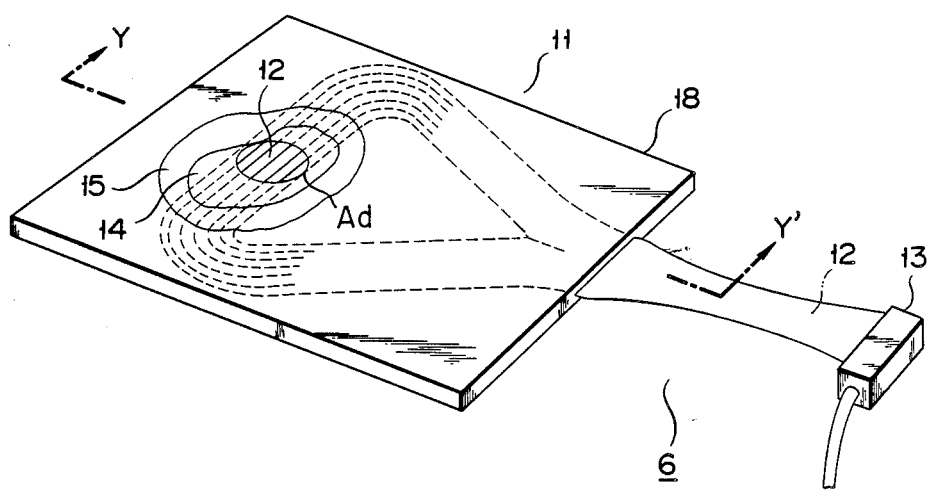
FIG. 2 is a perspective view schematically showing a configuration of the X-ray detector in FIG. 1.
Figure 3:
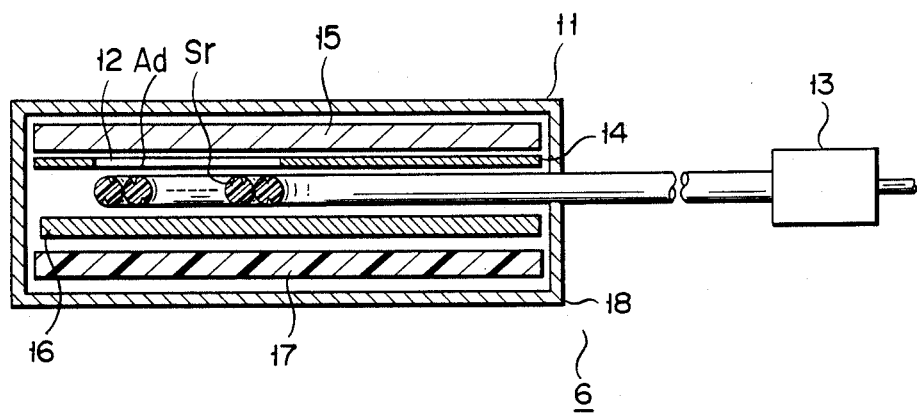
FIG. 3 is a schematic sectional view taken along the line Y–Y' of FIG. 2.

X-ray detector 6 shown in FIG. 1 adopts an embodiment of the present invention, and its detailed configuration will be described with reference to FIGS. 2 and 3. FIG. 2 is a schematic perspective view of detector 6, and FIG. 3 is a sectional view taken along the line Y–Y' of FIG. 2.

Detector 6 has flat X-ray detecting section 11, plastic fiber group 12, and optical detector 13. The light converted from X-rays by section 11 is transmitted to detector 13 through group 12 consisting of optical fibers. Detector 13 converts the optical signal transmitted from group 12 to an electric signal, and supplies the electric signal to unit 5. Section 11 detects X-rays incident on detection area Ad, and converts it to an optical signal.

Section 11 comprises group 12, light-shielding sheet 14, intensifying screen 15, light reflecting layer 16, substrate 17, and light-shielding cover 18. As shown in FIG. 2, group 12 is arranged to pass through area Ad in a flat loop having a width sufficient to cover area Ad. Two ends of group 12 extend outside section 11, and are coupled with detector 13. Screen 15, arranged on one surface of group 12, converts X-rays transmitted through object 2 to an optical signal. Sheet 14, having an opening corresponding to area Ad, is interposed between group 12 and screen 15. In the light emerging from screen 15, only light passing through area Ad is incident on group 12. Layer 16 reflects light from screen 15 and that transmitted through group 12 from the opening in sheet 14. Light-receiving coarse portion Sr is formed on a portion of one or both sides of group 12, corresponding to area Ad. Group 12, sheet 14, screen 15, and layer 16 are supported on substrate 17 of a material having a good X-ray transmittance. Portion Sr of group 12 is prepared by forming many recesses or scratches in the surface of group 12 with a knife, a wire brush, or a coarse emery paper. The entire section 11, excluding the extended portion of group 12, is covered with light-shielding cover or housing 18.

Detector 6 as described above is manufactured, e.g., in the following manner:

(1) Portion Sr is formed on a predetermined portion of one or both sides of group 12.

(2) Layer 16, group 12 with portion Sr, sheet 14, and screen 15 are disposed on substrate 17 with a predetermined positional relationship.

(3) The structure obtained in item (2), excluding the extended portion of group 12, is covered with cover 18, thereby preparing section 11.

(4) Detector 13 is coupled to the ends of group 12 extending outside section 11.

When portion Sr is formed on only one side of group 12, above items (1) and (2) can be modified as follows:

(1') Layer 16 and group 12 are disposed on substrate 17, and portion Sr is formed on a predetermined portion of group 12.

(2') Sheet 14 and screen 15 are disposed on the resultant structure.

With detector 6 shown in FIGS. 1 to 3, light is transmitted from screen 15 of section 11 to detector 13 through plastic fiber group 12, which have a higher transmittance than the acrylic resin plate employed in the conventional optical detector. Since attenuation in light during transmission is thus low, detector 13 can be arranged sufficiently removed from section 11. Therefore, basically only the size of section 11 must be considered in determining the size of detector 6. Since the thickness of section 11 can be as small as 1.5 mm or less, detector 6 can be made very compact. As a result, detector 6 can be easily incorporated in an X-ray radiographic device with less design restrictions. Since group 12 is used as a light transmitting path, the light detecting efficiency, i.e., the X-ray detecting efficiency, is greatly improved. This improves the S/N ratio of the detection signal in the control system, thereby improving the performance of the automatic X-ray exposure unit. The shape and size of area Ad can be arbitrarily selected when the arrangement pattern of group 12, the size and shape of portion Sr formed on group 12, and the shape and size of sheet 14 are correspondingly selected. For example, although area Ad is circular in FIG. 2, it can be triangular, square, or of any other arbitrary shape. Similarly, the number of areas Ad is not limited to one but can be plural. Since the transmittance of the optical fibers is high and the length of the fibers from portion Sr to detector 13 can be easily set to be uniform, the detecting efficiency (sensitivity) within area Ad can be easily set to be substantially uniform. In addition, the shape of area Ad can be set arbitrarily, the detecting coefficient can be set uniformly, and the overall device can be manufactured easily, thereby providing an inexpensive X-ray detector.

The present invention is not limited to the specific embodiment described above. Various changes and modifications may be made within the spirit and scope of the present invention.

For example, group 12 is not limited to being arranged at a portion corresponding to area Ad as shown in FIG. 2, but can be arranged uniformly at a portion not directly involved with the detection and transmission within an X-ray radiation region. When group 12 is uniformly arranged within the radiation region, even if radiographic photography is performed with an image pick-up tube at a considerably low voltage, shadows caused by the plastic fibers in detector 6 will not be easily formed.

Figure 4:
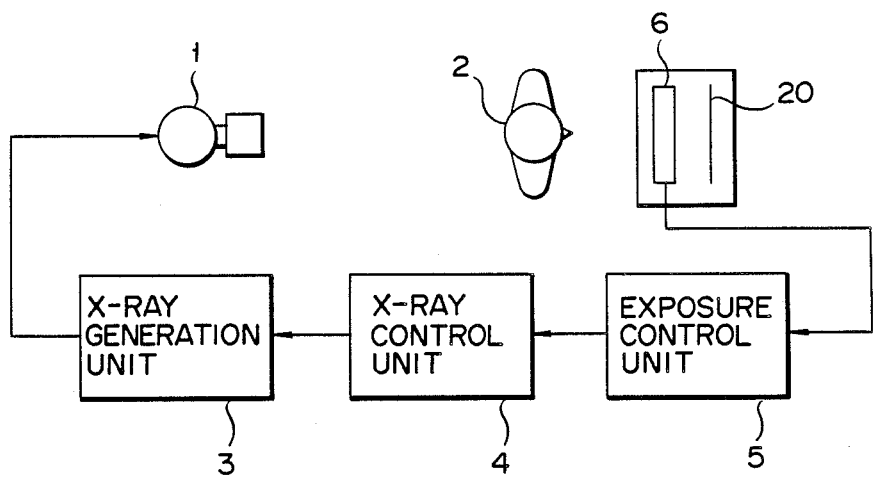
FIG. 4 is a block diagram schematically showing a configuration of an X-ray radiographic device incorporating an X-ray detector according to another embodiment of the present invention.

In the above embodiment, X-ray detector 6 according to the present invention is applied to an X-ray radiographic device using X-ray film 7. However, imaging plate 20 made of a charge type fluorescent material can be used as shown in FIG. 4, in place of film 7 of FIG. 1, thereby providing a computed radiography system. In this system, various image processings such as contrast emphasis of the image are possible. A semiconductor X-ray detector is often employed as the X-ray detector. According to the X-ray detector of the present invention, when contrast emphasis is performed, a shadow caused by the X-ray detector is not easily formed in the image, compared with the device using the semiconductor X-ray detector.

Glass fibers can be used as the optical fibers for light reception and transmission, instead of plastic fibers. In this case, although forming the coarse portion is slightly more difficult, the transmittance is improved over that of the plastic fibers.

When the optical detector is manufactured, it can be formed by integral molding using light-shielding plastic, instead of adhering the respective constituent components. If the components other than substrate 17 have sufficient strength, substrate 17 is not needed.

Intensifying screen 15 can be arranged at only area Ad, thereby eliminating light-shielding sheet 14.

The two ends of the optical fiber need not be coupled to the optical detector 13, but one end thereof can be arranged within area Ad and the other end thereof can be coupled to detector 13.

Figure 5A:
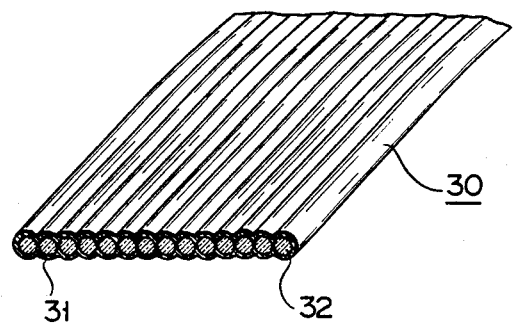
FIG. 5A is a view showing a flat cable of optical fibers for use in another embodiment of this invention.
Figure 5B:
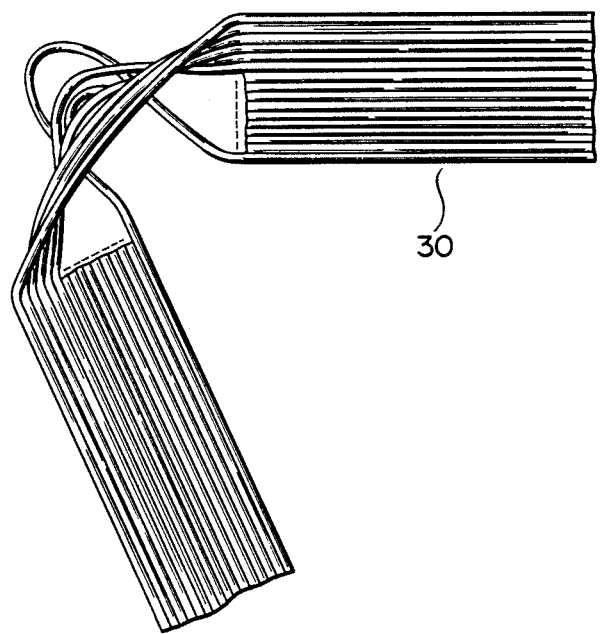
FIG. 5B is a view illustrating utilization of the flat cable shown in FIG. 5A.

Although in the aforementioned embodiment a large number of plastic fibers have been explained as having been arranged as an optical fiber group 12, use may be made, as an optical fiber group, of flat cable 30 consisting of optical fibers 32 arranged in parallel, bonded and covered with covering material 31 as shown in FIG. 5A. In this case, the optical fibers 32 of flat cable 30 may be individually loosened, manually or by virtue of a proper tool, at the bending portion of flat cable 30 to provide a desired configuration. Coarse portion Sr is preferred to be cut by, for example, a knife so that the depth of the cut is deeper than the width of coating material 31.

What is claimed is:

1. An X-ray detector comprising:

an intensifying screen for X-ray photography, said intensifying screen being arranged at least at a predetermined X-ray detection area and to convert incident X-rays to light;

a group of optical fibers, arranged flat on at least said predetermined X-ray detection area in tight contact with said intensifying screen and having a coarse portion, for receiving light from said intensifying screen, on at least one surface thereof corresponding to said detection area, for guiding light incident on said coarse portion;

a light-shielding member for covering said intensifying screen and said optical fiber group, excluding an extension of said optical fiber group and a connection of said optical fiber group with said intensifying screen; and an optical detector, coupled to a distal end of said extension of said optical fiber group, for converting an optical signal transmitted through said optical fiber group to an electrical signal.

2. A detector according to claim 1, wherein said fiber group is comprised of a flat cable with a plurality of optical fibers bundled in a plane.

3. A detector according to claim 1, wherein said optical fiber group comprises plastic fibers.

4. A detector according to claim 1, wherein said optical fiber group comprises glass fibers.

5. A detector according to claim 1, wherein said intensifying screen has a size which substantially corresponds to an X-ray radiation area, and a light-shielding layer having an opening corresponding to said detection area is provided between said intensifying screen and said optical fiber group.

6. A detector according to claim 1, wherein a light reflecting layer is arranged in tight contact with a portion near said optical fiber group corresponding to at least said detection area.

7. A detector according to claim 1, wherein a substrate for providing a predetermined strength is provided between a light reflecting layer and a light-shielding member.

8. A detector according to claim 1, wherein a plurality of detection areas are provided.

9. A method for manufacturing an X-ray detector, comprising:

a first step of forming a coarse portion on at least one surface of an optical fiber group arranged to be substantially flat and to correspond to a detection area;

a second step of sandwiching said optical fiber group having said coarse portion formed thereon between a light reflecting layer and an intensifying screen, said optical fiber being in tight contact with said intensifying screen, and placing the assembly on a substrate;

a third step of covering a laminated layer of said intensifying screen, said optical fiber group, said light reflecting layer, and said substrate, excluding an extension of said optical fiber group, with a light-shielding member; and a fourth step of coupling a distal end of said extension of said optical fiber group to an optical detector.

10. A method according to claim 9, wherein the first step comprises a step of scratching said optical fiber group, arranged to be flat, with a knife, so as to form said coarse portion.

11. A method according to claim 9, wherein the first step comprises a step of scratching said optical fiber group, arranged to be flat, with a wire brush, so as to form said coarse portion.

12. A method according to claim 9, wherein the first step comprises a step of scratching said optical fiber group, arranged to be flat, with an emery paper, so as to form said coarse portion.

13. A method according to claim 9, wherein the third step comprises a step of inserting a light-shielding layer, having an opening at a portion facing said detection area, between said optical fiber group and said intensifying screen.

14. An X-ray detector comprising:
a light-shielding housing for passing X-rays therethrough and for preventing external light within said housing, said light-shielding housing having a pair of substantially parallel planar outer surfaces spaced a predetermined distance apart so as to provide a compact construction;
an intensifying screen mounted within said light-shielding housing adjacent one of said outer surfaces for converting X-rays to light within said light-shielding housing;
a light-shielding sheet extending within said light-shielding housing and disposed along said intensifying screen, said light-shielding sheet defining a reception area for channeling the light transmitted through said intensifying screen;
optical detector means disposed outside of said light-shielding housing for converting the light to an electrical signal; and
a plurality of optical fibers each individually coupled to said optical detector means, said plurality of optical fibers defining a substantially flat loop having a loop section extending within said light-shielding housing, said loop section being in tight contact with said intensifying screen and having a light receiving portion aligned with said reception area, said plurality of optical fibers along said light receiving portion having surface irregularities for receiving X-rays passing through said reception area and for transmitting an optical signal to said optical detector means.

15. The X-ray detector defined in claim 14 also including a reflecting layer disposed between said loop section and a remaining one of said planar surfaces of said light-shielding housing.

16. The X-ray detector defined in claim 14, wherein said predetermined distance is not greater than 1.5 mm.

* * * * *